UNITED STATES PATENT OFFICE.

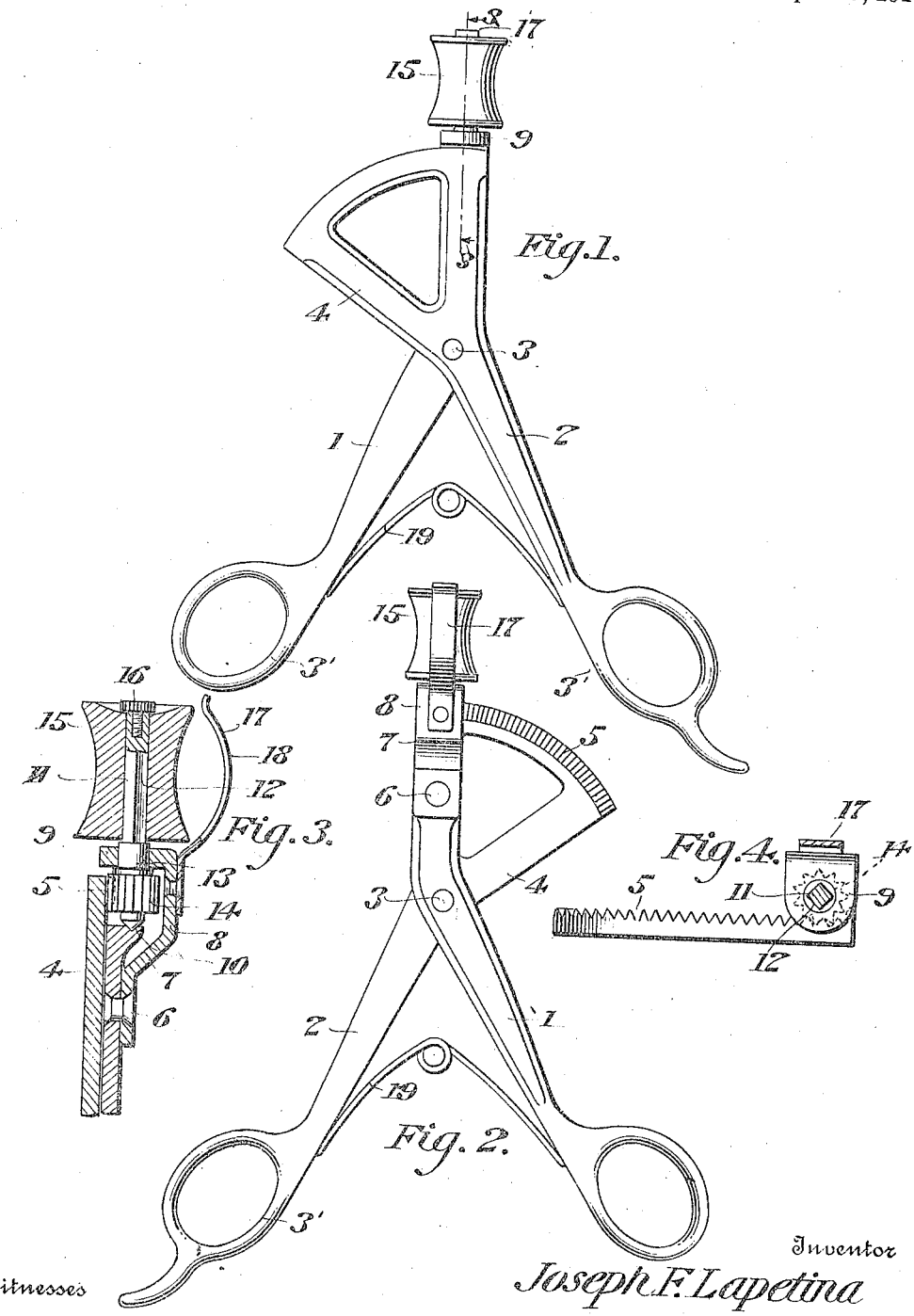

JOSEPH F. LAPETINA, OF OCEAN VIEW, VIRGINIA.

FINGER-NAIL BUFFER.

1,181,020.

Specification of Letters Patent.

Patented Apr. 25, 1916.

Application filed February 8, 1916. Serial No. 77,054.

*To all whom it may concern:*

Be it known that I, JOSEPH F. LAPETINA, a citizen of the United States, residing at Ocean View, in the county of Norfolk and State of Virginia, have invented new and useful Improvements in Finger-Nail Buffers, of which the following is a specification.

This invention relates to improvements in finger nail buffers and has particular application to a rotary finger nail buffer.

In carrying out the present invention, it is my purpose to provide a rotary buffer which may be held in one hand and operated thereby to polish the nails on the fingers and thumb of the other hand.

It is also my purpose to provide a buffer of the class described which will embrace the desired features of simplicity, efficiency and durability, which will be convenient to hold and manipulate, and wherein the component parts will be so arranged and correlated as to reduce the possibility of derangement to a minimum.

With the above and other objects in view, the invention consists in the construction, combination and arrangement of parts hereinafter set forth in and falling within the scope of the claims.

In the accompanying drawing: Figure 1 is a plan view of a finger nail buffer constructed in accordance with my present invention. Fig. 2 is a similar view showing the opposite side of the buffer. Fig. 3 is a longitudinal sectional view on the line 3—3 of Fig. 1. Fig. 4 is a cross sectional view.

Referring now to the drawing in detail, 1 and 2 designate levers pivoted to each other as at 3 after the fashion of the handles of a pair of scissors. One end of each lever 1, 2 is formed with a finger loop 3, while the other end of the lever 2 is formed with outwardly diverging arms 4 and secured to the outer ends of the arms 4 is a segmental rack 5 having teeth on one side thereof. The other end of the lever 1 terminates immediately beyond the pivot 3 of the levers and fastened to the outer side of such end of the lever 1, as by a rivet 6 or the like, is an arm 7. A portion of the arm 7 is offset from the lever as at 8 and formed on the outer end of the offset portion 8 of the arm 7 is a collar 9 arranged at right angles to the arm and projecting toward the rack 5. Formed in the end of the lever 1 confronting the collar 9 is a depression 10 alining axially with the opening in the collar and journaled in the collar 9 is a shaft 11 having the inner end thereof bearing in the depression 10. In the present instance, the portion of the shaft beyond the collar 9 is angular in cross section as shown at 12, while the portion of the shaft journaled in the collar is slightly greater in thickness than the portion 12 of the shaft in order to form a good bearing for the shaft. Formed on the shaft immediately adjacent to the inner side of the collar 9 is a shoulder 13 that coöperates with the depression 10 to prevent longitudinal movement of the shaft 11. Suitably fixed to the shaft 11 between the shoulder 13 and the end of the shaft journaled in the depression 10 is a pinion 14 meshing with the segmental rack 5, while surrounding the angular portion of the shaft 11 is a buffer roller 15 and formed in the outer end of the shaft 11 is an opening into which is threaded a set screw 16 that bears against the outer end of the roller 15 to prevent the roller from sliding off of the shaft.

Suitably fastened to the arm 8 is a strip 17 having one end thereof projecting beyond the collar 9 and curved as at 18 to form a finger rest between which and the roller 15 the finger may be inserted and this rest acts to hold the finger in such position as to engage the nail with the buffer roller.

In practice, the thumb and forefinger of one hand are passed through the finger loops 3 and one of the fingers on the other hand placed upon the rest formed by the curved end portion of the strip 17. The lever 2 is now swung about its pivotal connection with the lever 1 to swing the rack 5 and in this movement of the rack 5 a rotary movement is imparted to the pinion 14, thereby revolving the shaft 11 and the buffer roller 15 to polish the nail on the finger in the rest.

A suitable spring 19 is interposed between the loop ends of the levers and acts to hold the levers in normal position and to restore the same to such position.

The end tooth at one extremity of the rack 5 is relatively long as clearly illustrated in Fig. 4 of the drawing, and acts as a stop to limit the movement of the lever 1 under the action of the spring 19.

I claim:

1. In a rotary buffer of the class described, a pair of levers pivoted together scissors fashion and each having one end formed with a finger hold, an arm secured to the remaining end of one of said levers and projecting outwardly therefrom, a shaft rotatably mounted upon said arm, a pinion on said shaft, a segmental rack carried by the other end of the remaining lever and meshing with said pinion whereby in the movement of the last-named lever, said shaft will be rotated, and a buffer roller carried by said shaft.

2. In a rotary buffer of the class described, a pair of levers pivoted together scissors fashion and each having one end formed with a finger hold, an arm secured to the remaining end of one of said levers and projecting outwardly therefrom, a shaft rotatably mounted upon said arm, a pinion on said shaft, a segmental rack carried by the other end of the remaining lever and meshing with said pinion whereby in the movement of the last-named lever, said shaft will be rotated, a buffer roller carried by said shaft, and a strip secured to said arm and projecting outwardly therefrom and having the outer end portion thereof formed to provide a finger rest.

3. In a rotary finger nail buffer, a pair of levers pivoted together scissors fashion, a buffer roller carried by one of said levers, and means operable from the other lever to rotate said buffer roller.

4. In a rotary finger nail buffer, a pair of levers pivoted together scissors fashion, a buffer roller carried by one of said levers, means operable from the other lever to rotate said buffer roller, and means carried by the buffer roller carrying lever and arranged in juxtaposition to the buffer roller to form a finger rest.

In testimony whereof I affix my signature in presence of two witnesses.

JOSEPH F. LAPETINA.

Witnesses:
  JOHN J. MCCARTHY,
  BENNETT S. JONES.